United States Patent
Abdallah

(10) Patent No.: US 10,228,950 B2
(45) Date of Patent: Mar. 12, 2019

(54) METHOD AND APPARATUS FOR GUEST RETURN ADDRESS STACK EMULATION SUPPORTING SPECULATION

(71) Applicant: Intel Corporation, Santa Clara, CA (US)

(72) Inventor: Mohammad A. Abdallah, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 14/211,655

(22) Filed: Mar. 14, 2014

(65) Prior Publication Data
US 2014/0281388 A1    Sep. 18, 2014

Related U.S. Application Data

(60) Provisional application No. 61/793,174, filed on Mar. 15, 2013.

(51) Int. Cl.
   *G06F 9/38* (2018.01)
   *G06F 9/455* (2018.01)
   *G06F 9/30* (2018.01)

(52) U.S. Cl.
   CPC .......... *G06F 9/3806* (2013.01); *G06F 9/3017* (2013.01); *G06F 9/455* (2013.01)

(58) Field of Classification Search
   CPC ................................ G06F 9/3806; G06F 9/455
   See application file for complete search history.

(56) References Cited

U.S. PATENT DOCUMENTS 5,053,952 A    10/1991  Koopman, Jr. et al.
5,546,552 A     8/1996  Coon et al.
(Continued)

FOREIGN PATENT DOCUMENTS

CN       1823323 A    8/2006
CN     101506773 A    8/2009
(Continued)

OTHER PUBLICATIONS

Grant of Patent for Korean Application No. 10-2015-7029321, dated Apr. 28, 2017, 2 pages.
(Continued)

*Primary Examiner* — Aimee Li
*Assistant Examiner* — Courtney P Carmichael-Moody
(74) *Attorney, Agent, or Firm* — Nicholson De Vos Webster & Elliott LLP

(57) ABSTRACT

A microprocessor implemented method for maintaining a guest return address stack in an out-of-order microprocessor pipeline is disclosed. The method comprises mapping a plurality of instructions in a guest address space into a corresponding plurality of instructions in a native address space. For each function call instruction in the native address space fetched during execution, the method also comprises performing the following: (a) pushing a current entry into a guest return address stack (GRAS) responsive to a function call, wherein the GRAS is maintained at the fetch stage of the pipeline, and wherein the current entry comprises information regarding both a guest target return address and a corresponding native target return address associated with the function call; (b) popping the current entry from the GRAS in response to processing a return instruction; and (c) fetching instructions from the native target return address in the current entry after the popping from the GRAS.

18 Claims, 9 Drawing Sheets

(56) References Cited

U.S. PATENT DOCUMENTS

| | | | |
|---|---|---|---|
| 5,623,617 A | 4/1997 | Davidian | |
| 5,651,124 A | 7/1997 | Shen et al. | |
| 5,651,135 A | 7/1997 | Hatakeyama | |
| 5,742,802 A | 4/1998 | Harter et al. | |
| 5,784,638 A | 7/1998 | Goetz et al. | |
| 5,870,575 A * | 2/1999 | Kahle | G06F 9/45504 703/26 |
| 5,893,121 A | 4/1999 | Ebrahim et al. | |
| 5,953,520 A * | 9/1999 | Mallick | G06F 9/45504 703/26 |
| 5,956,495 A | 9/1999 | Kahle et al. | |
| 5,995,743 A | 11/1999 | Kahle et al. | |
| 6,138,225 A | 10/2000 | Upton et al. | |
| 6,142,682 A | 11/2000 | Skogby | |
| 6,202,127 B1 | 3/2001 | Dean et al. | |
| 6,205,545 B1 | 3/2001 | Shah et al. | |
| 6,305,013 B1 | 10/2001 | Miyamoto | |
| 6,463,582 B1 | 10/2002 | Lethin et al. | |
| 6,594,728 B1 | 7/2003 | Yeager et al. | |
| 6,711,672 B1 * | 3/2004 | Agesen | G06F 8/52 712/227 |
| 6,813,763 B1 | 11/2004 | Takahashi et al. | |
| 6,898,699 B2 * | 5/2005 | Jourdan | G06F 9/3802 712/238 |
| 6,928,641 B1 | 8/2005 | Szewerenko et al. | |
| 7,069,413 B1 | 6/2006 | Agesen et al. | |
| 7,080,366 B2 | 7/2006 | Kramskoy et al. | |
| 7,107,437 B1 | 9/2006 | Padwekar | |
| 7,111,145 B1 | 9/2006 | Chen et al. | |
| 7,203,932 B1 | 4/2007 | Gaudet et al. | |
| 7,225,436 B1 | 5/2007 | Patel | |
| 7,278,030 B1 | 10/2007 | Chen et al. | |
| 7,428,626 B2 | 9/2008 | Vega et al. | |
| 7,568,189 B2 | 7/2009 | Suba et al. | |
| 7,571,090 B2 | 8/2009 | Kinney | |
| 7,577,944 B2 | 8/2009 | Dinechin et al. | |
| 7,590,982 B1 | 9/2009 | Weissman | |
| 7,613,903 B2 | 11/2009 | Yoshida | |
| 7,617,493 B2 | 11/2009 | Mitran et al. | |
| 7,644,210 B1 * | 1/2010 | Banning | G06F 9/45504 710/100 |
| 7,734,895 B1 | 6/2010 | Agarwal et al. | |
| 7,752,417 B2 | 7/2010 | Manczak et al. | |
| 7,877,741 B2 | 1/2011 | Lin et al. | |
| 8,099,730 B2 | 1/2012 | Wang et al. | |
| 8,131,534 B2 | 3/2012 | Kinney | |
| 8,190,664 B2 | 5/2012 | Lundvall et al. | |
| 8,301,434 B2 | 10/2012 | Bohizic et al. | |
| 8,370,819 B2 | 2/2013 | Chakraborty et al. | |
| 8,428,930 B2 | 4/2013 | Bohizic et al. | |
| 8,438,334 B2 | 5/2013 | Bell, Jr. et al. | |
| 8,555,041 B2 * | 10/2013 | Renno | G06F 9/30054 712/208 |
| 8,561,040 B2 | 10/2013 | Rose | |
| 8,589,143 B2 | 11/2013 | Koh et al. | |
| 8,769,241 B2 | 7/2014 | Chiang et al. | |
| 8,799,879 B2 | 8/2014 | Wright et al. | |
| 8,819,647 B2 | 8/2014 | Mitran et al. | |
| 8,832,354 B2 | 9/2014 | Sokolov et al. | |
| 8,959,277 B2 | 2/2015 | Vick et al. | |
| 9,158,566 B2 | 10/2015 | Bohizic et al. | |
| 9,207,960 B2 | 12/2015 | Abdallah | |
| 9,542,187 B2 | 1/2017 | Abdallah | |
| 2001/0013093 A1 | 8/2001 | Banno et al. | |
| 2001/0037492 A1 | 11/2001 | Holzmann | |
| 2002/0042863 A1 | 4/2002 | Jeddeloh | |
| 2002/0066081 A1 | 5/2002 | Duesterwald et al. | |
| 2002/0066083 A1 | 5/2002 | Patel et al. | |
| 2002/0083302 A1 | 6/2002 | Nevill et al. | |
| 2002/0100022 A1 | 7/2002 | Holzmann | |
| 2002/0138712 A1 | 9/2002 | Yoshida | |
| 2002/0194464 A1 | 12/2002 | Henry et al. | |
| 2003/0120906 A1 | 6/2003 | Jourdan et al. | |
| 2003/0191792 A1 | 10/2003 | Waki et al. | |
| 2004/0044880 A1 | 3/2004 | Altman et al. | |
| 2004/0128658 A1 | 7/2004 | Lueh et al. | |
| 2004/0133760 A1 | 7/2004 | Thimmannagari et al. | |
| 2004/0154006 A1 | 8/2004 | Heishi et al. | |
| 2005/0240731 A1 | 10/2005 | Steely et al. | |
| 2006/0026365 A1 | 2/2006 | Yamazaki | |
| 2006/0026408 A1 | 2/2006 | Morris et al. | |
| 2006/0117308 A1 | 6/2006 | Hirayanagi et al. | |
| 2006/0206687 A1 | 9/2006 | Vega et al. | |
| 2006/0224816 A1 | 10/2006 | Yamada et al. | |
| 2007/0006178 A1 | 1/2007 | Tan | |
| 2007/0079296 A1 | 4/2007 | Li et al. | |
| 2007/0124736 A1 | 5/2007 | Gabor et al. | |
| 2007/0234358 A1 | 10/2007 | Hattori et al. | |
| 2007/0283125 A1 | 12/2007 | Manczak et al. | |
| 2008/0028195 A1 | 1/2008 | Kissell et al. | |
| 2008/0288238 A1 | 11/2008 | Heller, Jr. | |
| 2008/0301420 A1 * | 12/2008 | Inoue | G06F 9/30058 712/240 |
| 2008/0320286 A1 | 12/2008 | Campbell et al. | |
| 2009/0007105 A1 | 1/2009 | Fries et al. | |
| 2009/0049234 A1 | 2/2009 | Oh et al. | |
| 2009/0089488 A1 | 4/2009 | Yasui | |
| 2009/0119493 A1 | 5/2009 | Venkitachalam et al. | |
| 2009/0164991 A1 | 6/2009 | Takashige et al. | |
| 2009/0172642 A1 | 7/2009 | Lai | |
| 2009/0182973 A1 | 7/2009 | Greiner et al. | |
| 2009/0182985 A1 | 7/2009 | Greiner et al. | |
| 2009/0187697 A1 | 7/2009 | Serebrin | |
| 2009/0187731 A1 | 7/2009 | Deutschle et al. | |
| 2009/0187902 A1 | 7/2009 | Serebrin | |
| 2009/0228882 A1 | 9/2009 | Wang et al. | |
| 2009/0248611 A1 | 10/2009 | Xu et al. | |
| 2009/0254709 A1 * | 10/2009 | Agesen | G06F 8/52 711/118 |
| 2009/0300263 A1 | 12/2009 | Devine et al. | |
| 2009/0300645 A1 | 12/2009 | Devine et al. | |
| 2010/0058358 A1 | 3/2010 | Franke et al. | |
| 2010/0115497 A1 | 5/2010 | Das et al. | |
| 2010/0153662 A1 | 6/2010 | Vick et al. | |
| 2010/0153690 A1 | 6/2010 | Vick et al. | |
| 2010/0161875 A1 | 6/2010 | Chang et al. | |
| 2010/0274973 A1 | 10/2010 | Balakrishnan et al. | |
| 2010/0333090 A1 | 12/2010 | Wright et al. | |
| 2011/0023027 A1 | 1/2011 | Kegel et al. | |
| 2011/0071814 A1 | 3/2011 | Bohizic et al. | |
| 2011/0112820 A1 | 5/2011 | Bohizic et al. | |
| 2011/0113223 A1 | 5/2011 | Cavanna et al. | |
| 2011/0153307 A1 | 6/2011 | Winkel et al. | |
| 2011/0231593 A1 | 9/2011 | Yasufuku et al. | |
| 2011/0320756 A1 | 12/2011 | Craddock et al. | |
| 2011/0321061 A1 | 12/2011 | Craddock et al. | |
| 2012/0089982 A1 | 4/2012 | Wang et al. | |
| 2012/0198122 A1 | 8/2012 | Abdallah | |
| 2012/0198157 A1 | 8/2012 | Abdallah | |
| 2012/0198168 A1 | 8/2012 | Abdallah | |
| 2012/0198209 A1 | 8/2012 | Abdallah et al. | |
| 2012/0297109 A1 | 11/2012 | Guthrie et al. | |
| 2013/0024619 A1 | 1/2013 | Abdallah | |
| 2013/0024661 A1 | 1/2013 | Abdallah | |
| 2013/0138931 A1 * | 5/2013 | Gunna | G06F 9/3855 712/234 |
| 2013/0246766 A1 | 9/2013 | Gschwind et al. | |
| 2013/0339672 A1 | 12/2013 | Jacobi et al. | |
| 2014/0025893 A1 | 1/2014 | Brown | |
| 2014/0258696 A1 | 9/2014 | Srikantaiah | |
| 2014/0281410 A1 | 9/2014 | Abdallah | |
| 2016/0026488 A1 | 1/2016 | Bond et al. | |

FOREIGN PATENT DOCUMENTS

| | | |
|---|---|---|
| EP | 1555617 A2 | 7/2005 |
| TW | I287801 B | 10/2007 |

(56) References Cited

FOREIGN PATENT DOCUMENTS

TW 201250583 A 12/2012
WO 9737301 10/1997

OTHER PUBLICATIONS

Non-Final Office Action from U.S. Appl. No. 14/211,476, dated Apr. 6, 2017, 38 pages.
Beck, "System Software," 3rd edition, Section 2.4 and Appendix A SIC/XE Instruction Set and Addressing Modes, 1997, pp. 50-54, 495-499 and p. 93.
Chu, "RTL Hardware Design Using VHDL," John Wiley & Sons, 2006, pp. 279-281.
Extended European Search Report for Application No. 14770972.9, dated Mar. 17, 2017, 8 pages.
Extended European Search Report for Application No. EP12739955, dated Aug. 4, 2014, 6 pages.
Final Office Action from U.S. Appl. No. 13/359,767, dated Feb. 26, 2015, 23 pages.
Final Office Action from U.S. Appl. No. 13/359,767, dated May 14, 2014, 32 pages.
Final Office Action from U.S. Appl. No. 14/211,476, dated Dec. 13, 2016, 23 pages.
First Office Action from foreign counterpart China Patent Application No. 201280012962.8, dated May 20, 2016, 15 pages.
Grant of Patent for Korean Patent Application No. 1020137022671, dated Mar. 2, 2016, 1 page.
Guan, et al., "CoDBT: A Multi-Source Dynamic Binary Translator using Hardware-Software Collaborative Techniques," Journal of Systems Architecture; Shanghai Jiao Tong University, Oct. 2010, vol. 56(10), pp. 500-508.
International Preliminary Report on Patentability for Application No. PCT/US2012/022538, dated Aug. 8, 2013, 8 pages.
International Preliminary Report on Patentability for Application No. PCT/US2012/022589, dated Aug. 8, 2013, 6 pages.
International Preliminary Report on Patentability for Application No. PCT/US2014/026176, dated Sep. 24, 2015, 6 pages.
International Preliminary Report on Patentability for Application No. PCT/US2014/026252, dated Sep. 24, 2015, 7 pages.
International Search Report and Written Opinion for Application No. PCT/US2012/022538, dated Jul. 30, 2012, 9 pages.
International Search Report and Written Opinion for Application No. PCT/US2012/022589, dated Aug. 29, 2012, 7 pages.
International Search Report and Written Opinion for Application No. PCT/US2014/026176, dated Jun. 27, 2014, 7 pages.
International Search Report and Written Opinion for Application No. PCT/US2014/026252, dated Jun. 27, 2014, 8 pages.
Irvine, "Assembly Language for Intel-based Computers," 5th edition, 2007, p. 7.
Non-Final Office Action from U.S. Appl. No. 13/359,767, dated Jul. 16, 2015, 28 pages.
Non-Final Office Action from U.S. Appl. No. 13/359,767, dated Oct. 23, 2013, 20 pages.
Non-Final Office Action from U.S. Appl. No. 13/359,767, dated Sep. 23, 2014, 29 pages.
Non-Final Office Action from U.S. Appl. No. 13/359,817, dated Aug. 27, 2014, 16 pages.
Non-Final Office Action from U.S. Appl. No. 14/211,476, dated Aug. 9, 2016, 22 pages.
Non-Final Office Action from U.S. Appl. No. 14/211,476, dated Feb. 22, 2016, 23 pages.
Non-Final Office Action from U.S. Appl. No. 15/354,679, dated Mar. 21, 2017, 19 pages.
Notice of Allowance from U.S. Appl. No. 13/359,767, dated Apr. 11, 2016, 12 pages.
Notice of Allowance from U.S. Appl. No. 13/359,767, dated Aug. 8, 2016, 12 pages.
Notice of Allowance from U.S. Appl. No. 13/359,767, dated Dec. 16, 2015, 8 pages.
Notice of Allowance from U.S. Appl. No. 13/359,767, dated Mar. 14, 2017, 14 pages.
Notice of Allowance from U.S. Appl. No. 13/359,767, dated Nov. 15, 2016, 12 pages.
Notice of Allowance from U.S. Appl. No. 13/359,817, dated Feb. 19, 2015, 8 pages.
Notice of Allowance from U.S. Appl. No. 13/359,817, dated Feb. 26, 2016, 9 pages.
Notice of Allowance from U.S. Appl. No. 13/359,817, dated Jan. 20, 2015, 13 pages.
Notice of Allowance from U.S. Appl. No. 13/359,817, dated May 1, 2015, 9 pages.
Notice of Allowance from U.S. Appl. No. 13/359,817, dated Sep. 9, 2016, 14 pages.
Notice of Allowance from U.S. Appl. No. 13/359,817, dated Sep. 11, 2015, 9 pages.
Notice of Preliminary Rejection from foreign counterpart Korean Patent Application No. KR20157029321, dated Oct. 13, 2016, 8 pages.
Notification of Reason for Refusal from foreign counterpart Korean Patent Application No. 1020137022671, dated Sep. 15, 2015, 5 pages.
Office Action from foreign counterpart Chinese patent application No. 201280012962, dated Jan. 22, 2017, 8 pages.
Office Action for European Application No. 12739955, dated Apr. 14, 2015, 3 pages.
Office Action for European Application No. 12739955, dated Feb. 22, 2017, 3 pages.
Final Office Action from U.S. Appl. No. 14/211,476, dated Oct. 13, 2017, 32 pages.
Final Office Action from U.S. Appl. No. 15/208,404, dated Nov. 3, 2017, 35 pages.
Third Office Action from foreign counterpart China Patent Application No. 201280012962.8, dated Sep. 21, 2017, 8 pages.
Non-Final Office Action from U.S. Appl. No. 14/961,464, dated Nov. 20, 2017, 51 pages.
First Office Action and Search report from foreign counterpart Chinese Patent Application No. 201480021703.0, dated Dec. 15, 2017, 30 pages. (translation available only for office action).
Notice of Allowance from U.S. Appl. No. 15/176,079, dated Nov. 24, 2017, 27 pages.
Advisory Action from U.S. Appl. No. 15/208,404, dated May 19, 2017, 2 pages.
Bhargava, et al., "Accelerating Two-Dimensional Page Walks for Virtualized Systems," ACM SIGOPS Operating Systems Review 42.2 (2008), pp. 26-35. Retrieved on [Mar. 19, 2015] Retrieved from the Internet: URL: http://dl.acm.org/citation.cfm?id=1346285.
Bungale, et al., "PinOS: a Programmable Framework for Whole-System Dynamic Instrumentation," Proceedings of the 3rd International Conference on Virtual Execution Environments, ACM, 2007, Retrieved on [Jul. 6, 2015] Retrieved rom the Internet: URL: http://dl.acm.org/citation.cfm?id=1254830.
Duesterwald, E., "Design and Engineering of a Dynamic Binary Optimizer," Proceedings of the IEEE, vol. 93(2), 2005, pp. 436-448. Retrieved on [Jul. 9, 2014] from the Internet: URL: http://ieeexplore.ieee.org/stamp.jsp?tp=&arnumber=1386661.
Final Office Action from U.S. Appl. No. 13/359,832, dated May 27, 2014, 24 pages.
Final Office Action from U.S. Appl. No. 15/208,404, dated Feb. 15, 2017, 26 pages.
Final Office Action from U.S. Appl. No. 15/354,679, dated Sep. 14, 2017, 39 pages.
Fisher-Ogden, J., "Hardware Support for Efficient Virtualization," University of California, San Diego, Tech. Rep (2006), Retrieved on [Jul. 9, 2014] from the Internet: URL: http://dator8.info/2010/27.pdf.
Gligor, et al., "Using Binary Translation in Event Driven Simulation for Fast and Flexible MPSoC Simulation," Proceedings of the 7th IEEE/ACM International Conference on Hardware/Software co-design and system synthesis, ACM, 2009, Retrieved on [Jul. 6, 2015] Retrieved from the Internet: URL: http://dl.acm.org/citation.cfm?id=1629446.

(56) References Cited

OTHER PUBLICATIONS

International Preliminary Report on Patentability for Application No. PCT/US2012/022598, dated Aug. 8, 2013, 6 pages.
International Preliminary Report on Patentability for Application No. PCT/US2012/022760, dated Aug. 8, 2013, 6 pages.
International Preliminary Report on Patentability for Application No. PCT/US2012/022773, dated Aug. 8, 2013, 7 pages.
International Preliminary Report on Patentability for Application No. PCT/US2012/022780, dated Aug. 8, 2013, 6 pages.
International Search Report and Written Opinion for Application No. PCT/US2012/022598, dated Aug. 28, 2012, 7 pages.
International Search Report and Written Opinion for Application No. PCT/US2012/022760, dated Jul. 16, 2012, 7 pages.
International Search Report and Written Opinion for Application No. PCT/US2012/022773, dated Sep. 20, 2012, 9 pages.
International Search Report and Written Opinion for Application No. PCT/US2012/022780, dated Jul. 31, 2012, 7 pages.
Mihocka, et al., "Virtualization without Direct Execution or Jitting: Designing a Portable Virtual Machine Infrastructure," 1st Workshop on Architectural and Micro-architectural Support for Binary Translation in ISCA-35, 2008. Retrieved on [Feb. 9, 2015] Retrieved from the Internet URL: http://index-of.es/Misc/VirtualizationWithoutHardwareFinal.pdf.
Non-Final Office Action from U.S. Appl. No. 13/359,832, dated Oct. 22, 2013, 15 pages.
Non-Final Office Action from U.S. Appl. No. 13/359,832, dated Sep. 23, 2014, 27 pages.
Non-Final Office Action from U.S. Appl. No. 13/359,939, dated Nov. 5, 2013, 6 pages.
Non-Final Office Action from U.S. Appl. No. 13/359,961, dated Dec. 17, 2013, 10 pages.
Non-Final Office Action from U.S. Appl. No. 13/360,024, dated Sep. 29, 2014, 19 pages.
Non-Final Office Action from U.S. Appl. No. 15/009,684, dated Aug. 24, 2016, 10 pages.
Non-Final Office Action from U.S. Appl. No. 15/208,404, dated Jul. 6, 2017, 33 pages.
Non-Final Office Action from U.S. Appl. No. 15/208,404, dated Oct. 3, 2016, 26 pages.
Notice of Allowance from U.S. Appl. No. 13/359,832, dated Feb. 19, 2015, 8 pages.
Notice of Allowance from U.S. Appl. No. 13/359,832, dated Jan. 7, 2016, 12 pages.
Notice of Allowance from U.S. Appl. No. 13/359,832, dated Jan. 13, 2017, 12 pages.
Notice of Allowance from U.S. Appl. No. 13/359,832, dated Jun. 8, 2015, 12 pages.
Notice of Allowance from U.S. Appl. No. 13/359,832, dated May 17, 2016, 14 pages.
Notice of Allowance from U.S. Appl. No. 13/359,832, dated Sep. 14, 2016, 12 pages.
Notice of Allowance from U.S. Appl. No. 13/359,832, dated Sep. 18, 2015, 12 pages.
Notice of Allowance from U.S. Appl. No. 13/359,939, dated Aug. 25, 2014, 15 pages.
Notice of Allowance from U.S. Appl. No. 13/359,939, dated Dec. 3, 2014, 12 pages.
Notice of Allowance from U.S. Appl. No. 13/359,939, dated Dec. 9, 2016, 12 pages.
Notice of Allowance from U.S. Appl. No. 13/359,939, dated Dec. 28, 2015, 12 pages.
Notice of Allowance from U.S. Appl. No. 13/359,939, dated Mar. 30, 2015, 12 pages.
Notice of Allowance from U.S. Appl. No. 13/359,939, dated May 6, 2016, 12 pages.
Notice of Allowance from U.S. Appl. No. 13/359,939, dated May 12, 2014, 13 pages.
Notice of Allowance from U.S. Appl. No. 13/359,939, dated Sep. 1, 2015, 12 pages.
Notice of Allowance from U.S. Appl. No. 13/359,939, dated Sep. 2, 2016, 12 pages.
Notice of Allowance from U.S. Appl. No. 13/359,961, dated Jul. 11, 2014, 13 pages.
Notice of Allowance from U.S. Appl. No. 13/359,961, dated Jul. 15, 2015, 12 pages.
Notice of Allowance from U.S. Appl. No. 13/359,961, dated Mar. 26, 2015, 12 pages.
Notice of Allowance from U.S. Appl. No. 13/359,961, dated Oct. 28, 2014, 14 pages.
Notice of Allowance from U.S. Appl. No. 13/360,024, dated Jan. 10, 2017, 9 pages.
Notice of Allowance from U.S. Appl. No. 13/360,024, dated Jan. 20, 2015, 6 pages.
Notice of Allowance from U.S. Appl. No. 13/360,024, dated Jul. 5, 2016, 10 pages.
Notice of Allowance from U.S. Appl. No. 13/360,024, dated Mar. 1, 2016, 11 pages.
Non-Final Office Action from U.S. Appl. No. 15/176,079, dated Jul. 13, 2017, 39 pages.
Notice of Allowance from U.S. Appl. No. 13/360,024, dated Mar. 23, 2017, 9 pages.
Notice of Allowance from U.S. Appl. No. 13/360,024, dated May 1, 2015, 10 pages.
Notice of Allowance from U.S. Appl. No. 13/360,024, dated Oct. 28, 2015, 10 pages.
Notice of Allowance from U.S. Appl. No. 15/009,684 dated Apr. 17, 2017, 20 pages.
Notice of Allowance from U.S. Appl. No. 15/009,684, dated Dec. 29, 2016, 9 pages.
Du, et al., "Performance Profiling of Virtual Machines," Acm Sigplan Notices, Jul. 2011, Retrieved from https://dl.acm.org/citation.cfm?id=1952686 on Sep. 8, 2018, vol. 46 (7), 13 pages.
Final Office Action from U.S. Appl. No. 15/208,404, dated Sep. 10, 2018, 22 pages.
Notice of Abandonment from U.S. Appl. No. 15/042,005, dated Aug. 3, 2018, 2 pages.
Notice of Allowance from U.S. Appl. No. 14/961,464, dated Sep. 19, 2018, 8 pages.
Notice on Grant of Patent Right for Invention from foreign counterpart Chinese Patent Application No. 201480021703.0, dated Aug. 2, 2018, 4 pages.
Varanasi, et al., "Hardware-supported virtualization on ARM," Proceedings of the Second Asia-Pacific Workshop on Systems, ACM, 2011. Retrieved from the Internet:URL http://ts.data61.csiro.au/publications/nicta_full_text/4938.pdf on Sep. 8, 2018, 5 pages.
Final Office Action from U.S. Appl. No. 14/961,464, dated Jun. 13, 2018, 27 pages.
Non Final Office Action from U.S. Appl. No. 14/211,476, dated Jul. 10, 2018, 70 pages.
Non-Final Office Action from U.S. Appl. No. 15/042,005, dated Jan. 22, 2018, 10 pages.
Non-Final Office Action from U.S. Appl. No. 15/208,404, dated Apr. 5, 2018, 25 pages.
Notice of Allowance from U.S. Appl. No. 15/354,679, dated Mar. 28, 2018, 25 pages.
Notice on Grant of Patent Right for Invention from foreign counterpart Chinese Patent Application No. 201280012962.8, dated Apr. 9, 2018, 4 pages.

* cited by examiner

METHOD AND APPARATUS FOR GUEST RETURN ADDRESS STACK EMULATION SUPPORTING SPECULATION

CROSS-REFERENCE TO RELATED APPLICATIONS

This application claims the benefit of U.S. Provisional Application No. 61/793,174, filed Mar. 15, 2013, which is hereby incorporated by reference.

This application is related to U.S. application Ser. No. 13/359,767, "GUEST INSTRUCTION TO NATIVE INSTRUCTION RANGE BASED MAPPING USING A CONVERSION LOOK ASIDE BUFFER OF A PROCESSOR," by Mohammad Abdallah, filed Jan. 27, 2012 (now U.S. Pat. No. 9,710,387, issued Jul. 18, 2017; hereinafter, "application Ser. No. 13/359,767"), which is hereby incorporated by reference.

This application is related to U.S. application Ser. No. 14/211,476, "METHOD AND APPARATUS TO ALLOW EARLY DEPENDENCY RESOLUTION AND DATA FORWARDING IN A MICROPROCESSOR," filed Mar. 14, 2014, which is hereby incorporated by reference.

FIELD OF THE INVENTION

Embodiments according to the present invention generally relate to microprocessor architecture and more particularly to an emulated architecture for out-of-order (OOO) microprocessors.

BACKGROUND OF THE INVENTION

Many types of digital computer system utilize code transformation/translation or emulation to implement software-based functionality. Generally, translation and emulation both involve examining a program of software instructions and performing the functions and actions dictated by the software instructions, even though the instructions are not "native" to the computer system. For example, in an emulated architecture, the non-native (or guest) instructions may be mapped into a form of native instructions, which are designed to execute on the hardware of the computer system.

As described in detail in application Ser. No. 13/359,767, guest instruction blocks are converted or mapped into native conversion blocks in an emulated architecture. As described in application Ser. No. 13/359,767, guest instructions in an emulated architecture can be from a number of different guest instruction architectures (e.g., Java, x86, MIPS etc.) and multiple guest instruction blocks can be converted into one or more corresponding native conversion blocks. This conversion occurs on a per instruction basis. For example, a block of guest code may be converted into several corresponding instruction sequences of native code.

Further, as described in application Ser. No. 13/359,767, a structure such as a Conversion Lookaside Buffer (CLB) is commonly used to provide a mapping between the guest addresses and native addresses in emulated architectures. A conversion look aside buffer is typically used to cache the address mappings between guest and native blocks; such that the most frequently encountered native conversion blocks are accessed through low latency availability to the processor. Using a CLB accelerates the process of translating guest instructions from a guest instruction architecture into native instructions of a native instruction architecture for execution on a native processor. The guest instructions are rapidly converted into native instructions using the CLB and pipelined to the native processor hardware for rapid execution.

In certain instances, a CLB may get temporarily flooded with too many entries because of function calls to the same function in the guest space. A function call comprises both a call to the function from within an instruction sequence and a return back to the instruction sequence after the function has executed. For each return, following a call, (hereinafter referred to as "function returns") from a function in guest space then, a new corresponding instruction sequence is typically started in native space from the return address of the function. Accordingly, a new mapping would have to be created in the CLB for each such return. Because a function may be called from multiple places from within a block of guest code, it results in several guest-to-native mappings for the function in the CLB. This leads to a temporary flooding of the CLB, which is a precious resource in the processor pipeline and is a very inefficient use of the CLB structure.

BRIEF SUMMARY OF THE INVENTION

Accordingly, a need exists for a method and apparatus for creating a more efficient and flexible approach to cache guest-to-native mappings for function returns in the guest code. In one embodiment, a dedicated hardware structure called a Guest Return Address Stack (GRAS) is used to speculatively cache the mappings for function returns, wherein the GRAS structure caches both the guest address and the native address for a function return, and wherein the GRAS structure resides at the front end of the processor pipeline, e.g., at the fetch stage. After a mapping is created, when the function is encountered in the code, the GRAS is looked up to determine a prediction for the target of the function return. It, therefore, prevents the CLB from being flooded with multiple entries associated with function returns from the same function and advantageously conserves precious space in the CLB.

In one embodiment of the present invention, the GRAS is implemented in hardware and used to predict the target of a function return. Accordingly, stack operations, in one embodiment, are performed speculatively in the Fetch Unit of an out-of-order (OOO) microprocessor. In a deep and wide superscalar processor, however, there can be many calls and returns that may be encountered in the code during execution. Because some of the mappings created within the GRAS may be associated with functions on a mispredicted path (e.g., because the speculation may be incorrect), the stack information within the GRAS may be corrupted.

In one embodiment of the present invention, the GRAS is maintained and updated similar to a linked list structure to prevent the stack from getting corrupted. For example, the GRAS may be implemented using a circular buffer with each entry carrying a pointer to a prior entry. Also, in one embodiment, two global variables are maintained, wherein one points to the top of the stack and the other points to the next available entry in the GRAS. A new mapping associated with a function call is inserted into the next available entry, thus no entry is overwritten. Accordingly, in the case of a misprediction, the pointers used to keep track of the entries in the GRAS can simply be adjusted to recover a prior state. Because no entries are overwritten, the linked-list implementation of the GRAS structure prevents corruption of the stack in the event of a misprediction.

In one embodiment, a microprocessor implemented method for maintaining a guest return address stack in an out-of-order microprocessor pipeline is presented. The method comprises mapping a plurality of instructions in a guest address space into a corresponding plurality of instructions in a native address space. For each function call instruction in the native address space fetched during execution, the method also comprises performing the following: (a) pushing a current entry into a guest return address stack (GRAS) responsive to a function call, wherein the GRAS is maintained at the fetch stage of the pipeline, and wherein the current entry comprises information regarding both a guest target return address and a corresponding native target return address associated with the function call; (b) popping the current entry from the GRAS in response to processing a return instruction; and (c) fetching instructions from the native target return address in the current entry after the popping from the GRAS.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
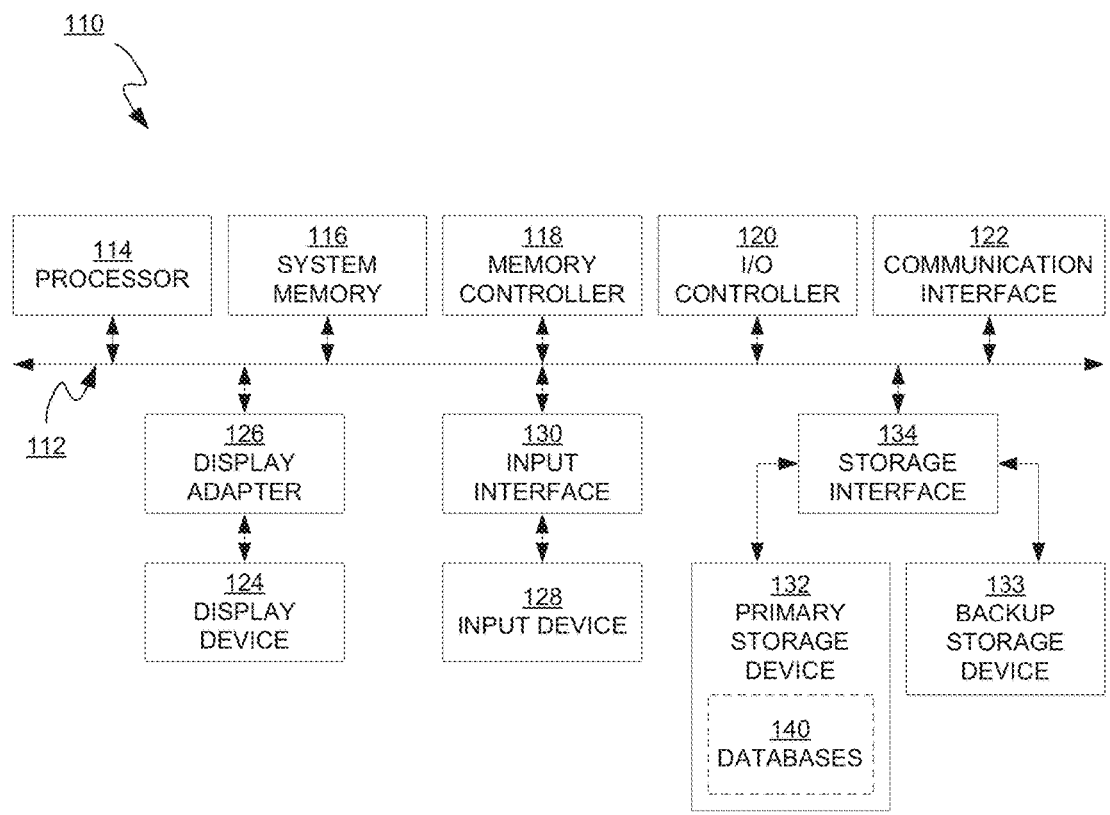
FIG. 1 is an exemplary computer system in accordance with embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

NOTATION AND NOMENCLATURE

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "mapping," "pushing," "popping," "fetching," and "determining," or the like, refer to actions and processes (e.g., flowchart 900 of FIG. 9) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of being integrated with a processor 114 of an embodiment of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 of an embodiment of the present invention and a system memory 116.

Processor 114 incorporates embodiments of the present invention and generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. In one embodiment, processor 114 may be an out of order microprocessor. In a different embodiment, processor 114 may be a superscalar processor. In yet another embodiment, processor 114 may comprise multiple processors operating in parallel.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110. Alternatively, databases 140 may represent (be stored on) one or more physically separate devices capable of being accessed by a computing device, such as computing system 110.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Method and Apparatus for Guest Return Address Stack Emulation Supporting Speculation As described in detail in application Ser. No. 13/359,767, a structure such as a Conversion Lookaside Buffer (CLB) is commonly used to provide a mapping between the guest addresses and native addresses in emulated architectures. A conversion look aside buffer is typically used to cache the address mappings between guest and native blocks; such that the most frequently encountered native conversion blocks are accessed through low latency availability to the processor.

Under certain circumstances, a conversion lookaside buffer (CLB) may become temporarily flooded with too many entries because of function calls to the same function in the guest space. A function call comprises both a call to the function from within an instruction sequence and a return, which is a branch back to the instruction sequence after the function has executed. For each return (hereinafter referred to as "function returns"), following a call, a new corresponding instruction sequence is typically started in native space from the return address of the function. Accordingly, a new mapping (from the guest address to the corresponding native return address) would have to be created in the CLB for each such return. Because a function may be called from multiple places from within a block of guest code, creating a new mapping for each instance of the function return results in several guest-to-native mappings for the function in the CLB. This leads to a temporary flooding of the CLB, which is a precious resource in the processor pipeline and is a very inefficient use of the CLB structure.

Embodiments of the present invention provide a method and apparatus for creating a more efficient and flexible approach to cache guest-to-native mappings for function returns in the guest code. In one embodiment, a dedicated hardware structure called a Guest Return Address Stack (GRAS) is used to cache the mappings for function returns at the front end of the processor pipeline, wherein the GRAS structure caches both the guest address and the native address for a function return. After a mapping is created, when the same function is encountered in the code, the GRAS is looked up to determine a prediction for the target of the function return. It, therefore, prevents the CLB from being flooded with multiple entries associated with function returns from the same function and advantageously conserves precious space in the CLB.

In one embodiment of the present invention, the GRAS is implemented in hardware and used to predict the target of a function return. Accordingly, stack operations, in one embodiment, are performed speculatively and, typically, in the Fetch Unit of an out-of-order (OOO) microprocessor. In a deep and wide superscalar processor, however, there can be many calls and returns that may be encountered in the code during execution. Because some of the mappings created within the GRAS may be associated with functions on a mispredicted path, the stack information within the GRAS may be corrupted.

In one embodiment of the present invention, the GRAS is maintained and updated similar to a linked list structure to prevent the stack from getting corrupted. For example, the GRAS is implemented using a circular buffer with each entry carrying a pointer to a prior entry. Also, in one embodiment, a first global variable is maintained that points to the top of the stack and a second global variable is maintained that points to the next available entry in the GRAS. A new mapping associated with a function call is inserted into the next available entry, thus no entry is overwritten. Accordingly, in the case of a misprediction, the pointers used to keep track of the entries in the GRAS can simply be adjusted to recover a prior state. Because no entries are overwritten, the linked-list implementation of the GRAS structure prevents corruption of the stack in the event of a misprediction.

Figure 2:
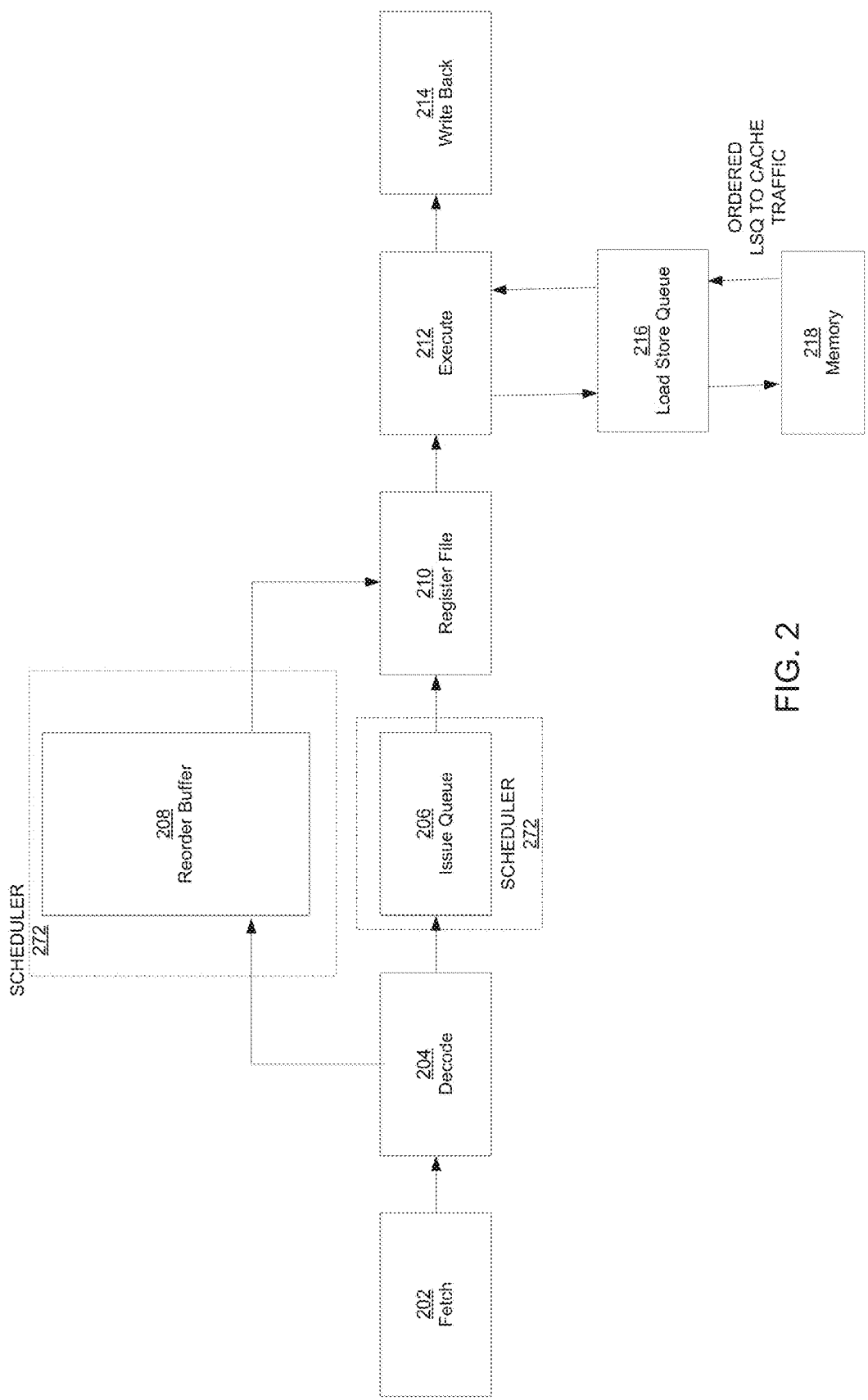
FIG. 2 is an exemplary diagram of pipe stages of a pipeline for an out of order microprocessor on which embodiments of the present invention can be implemented in accordance with one embodiment of the present invention.

FIG. 2 is a block diagram of pipe stages an exemplary pipeline for an OOO microprocessor in accordance with embodiments of the present invention.

Instructions are fetched at the fetch stage 202 and placed in the instruction fetch queue (IFQ) (not shown) within fetch stage 202. The instructions are generally the original assembly instructions found in the executable program. These instructions reference the architectural registers which are stored in register file 210. If the first fetched instruction was to be interrupted or raise an exception, the architectural register file 210 stores the results of all instructions until that point. Stated differently, the architectural register file stores the state that needs to be saved and restored in order to return back to the program break point during debugging or otherwise.

In an OOO microprocessor, the instructions execute out-of-order while still preserving data dependence constraints. Because instructions may finish in an arbitrary order, the architectural register file 210 cannot be modified by the results of out of order instructions as they finish because it would make it difficult to restore their values accurately in the event of an exception or an interrupt. Hence, every instruction that enters the pipeline is provided a temporary register where it can save its result. The temporary registers are eventually written into the architectural register file in program order when the associated instruction retires. Thus, even though instructions are being executed out of order, the contents of the architectural register files change as though they were being executed in program order.

The ROB 208 facilitates the process of instruction retirement. After the instructions are dispatched from the fetch unit 202, they are decoded by decode module 204 and are placed in the ROB 208 and issue queue 206 (IQ). The ROB 208 and IQ 206 may be part of a scheduler module 272. As instructions are issued out of IQ 206 out of order, they are executed by execute module 212. Instruction execution at 212 is allowed out of order as long as data dependencies are maintained.

In one embodiment, the write back module 214 will write the resulting values from those instructions back to the temporary registers in ROB 208 and rely on the ROB 208 to facilitate committing or "retiring" the instructions in order. However, in a different embodiment, write back module 214 writes the values resulting from instruction execution directly into register file 210 without sorting them. The unordered elements are added in physical memory to the register file 210 in an unordered fashion and are then retired to the architectural files in order at the retirement stage using a ROB initiated protocol.

The instructions issued out of order from the IQ 206 may also comprise loads and stores. As explained above, when loads and stores are issued out of order from the IQ 206, there are memory dependencies between them that need to be resolved before those instructions can be committed. Accordingly, the store instructions are stored in order in a Load Store Queue (LSQ) 216 while the dependencies between the loads and stores are resolved with the help of ROB 208.

Figure 3A:
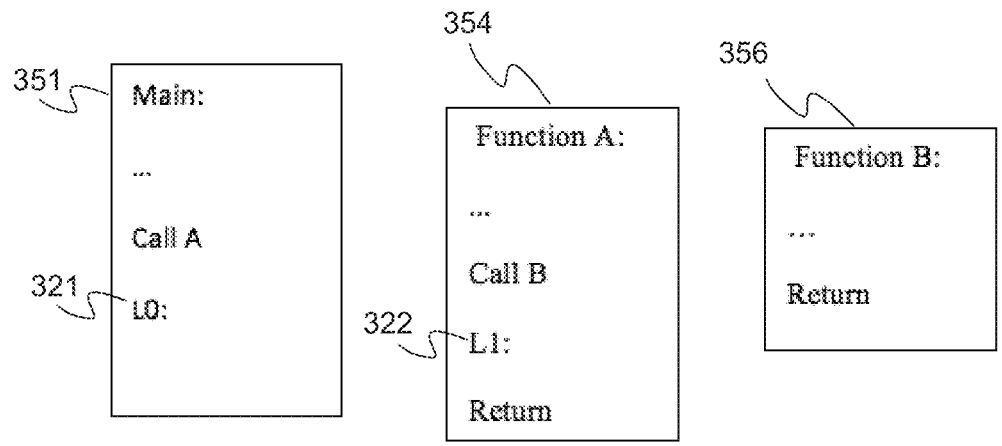
FIG. 3A illustrates an exemplary series of functions in guest address space.

FIG. 3A illustrates an exemplary series of functions in guest address space. The main function 351 comprises a call to function A 354. Function A 354 comprises a call to function B 356. The instruction following the call to function A within main function 351 is L0 321 and, accordingly, L0 321 is the return address from function A 354. The instruction following the call to function B within function A 354 is L1 322 and, accordingly, L1 322 is the return address from function B 356.

As discussed in application Ser. No. 13/359,767, guest instruction blocks are converted or mapped into native conversion blocks in an emulated architecture. As described in application Ser. No. 13/359,767, guest instructions in an emulated architecture can be from a number of different guest instruction architectures (e.g., Java, x86, MIPS etc.) and multiple guest instruction blocks can be converted into one or more corresponding native conversion blocks. This conversion occurs on a per instruction basis.

Also, as described in application Ser. No. 13/359,767, in one embodiment, every instruction block concludes with a far branch. (The difference between near branches and far branches are detailed in application Ser. No. 13/359,767, however, for purposes of the embodiments of the present invention, far branches are used as examples and will hereinafter be referred to as "branches.") For example, a function call in guest space will result in a guest branch and, accordingly, end the instruction sequence it occurs within. A new instruction sequence will be started from the return of the function call.

Figure 3B:
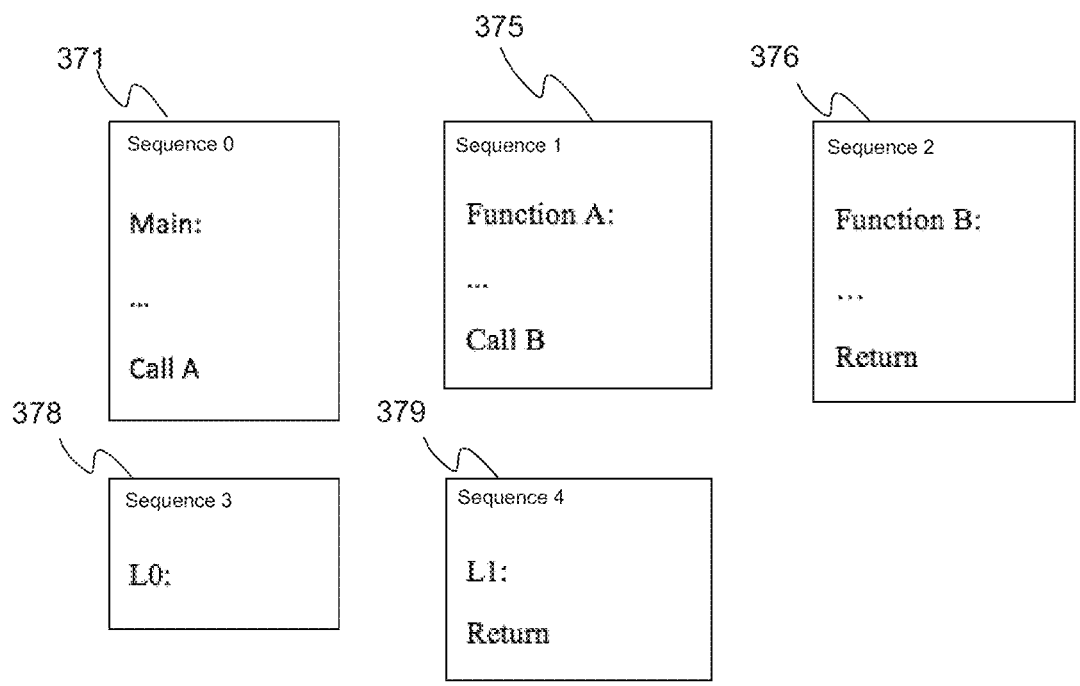
FIG. 3B illustrates the respective instruction sequences that result from a mapping of the functions of FIG. 3A, which reside in a guest address space, to a native address space.

FIG. 3B illustrates the respective instruction sequences that result from a mapping of the functions of FIG. 3A, which reside in a guest address space, to a native address space. Sequence 0 371 in native space corresponds to the sequence which starts at the beginning of the main function 351 and ends at the call to function A within function main 351. Sequence 3 corresponds to a sequence that starts at the L0 label 321, which is also the return address from the call to function A.

Sequence 1 375 in native space corresponds to the sequence which starts at the beginning of function A 354 and ends at the call to function B within function A 354. Sequence 3 corresponds to a sequence that starts at the L1 label 322, which is also the return address from the call to function B.

Sequence 2 376 corresponds to function B 356.

Typically, a separate mapping would need to be created for each return address from a call in the CLB. For example, a separate mapping would be created for L0 321 in guest address space, which would be mapped to sequence 3 378 in native address space. Also, a separate mapping would be created for L1 322 in guest address space, which would be mapped to sequence 4 379 in native address space. The two entries created in the CLB mapping are useful only if function B 356 is called from the same address within function A 354 (corresponding to the sequence 4 379 entry) and if function A 354 is called from the same address within function main A (corresponding to the sequence 3 378 entry).

Since a typical function is called from several different addresses in a program, for each function call, a new mapping is created for the return address from the respective function call. This is because the return address is a function of the location the corresponding call was made from and, therefore, a corresponding entry in the CLB is not reusable by any other instance of the function return. As stated above, this leads to a temporary flooding of the CLB, which is a precious resource and is a very inefficient use of the CLB.

In conventional non-emulated architectures, this problem did not arise because an offset address could simply be added to the address of the call to determine the return address in native space. For example, if the instructions in the guest address space in FIG. 3A did not need to be mapped to a corresponding set of instructions in a native address space, then an offset could be added to a call, e.g., Call A to determine the return address of the call, e.g., L0 321 (which is the corresponding return address for Call A).

Typically, in conventional non-emulated architecture, a return address stack (RAS) in native space can be maintained in software or hardware. A RAS is a structure typically used to predict the target of a function return. When a call is encountered in the code, the Program Counter (PC) of the calling instruction plus an offset (equal to an instruction size) will be inserted into the RAS. In other words, the PC of the return address (calculated as the PC of the calling instruction plus the offset) would be inserted (or pushed) into the RAS. A return from the called function will result in the stack being popped using the saved address as the next PC address.

Embodiments of the present invention maintain a Guest Return Address Stack (GRAS) in hardware at the front end of the pipeline to emulate the software return address stack in guest address space. The GRAS of the present invention emulates the structure of a conventional RAS and, like the RAS, is also used to predict the target of a function return. It should be noted that the GRAS does not replace the software RAS maintained at the back-end of the machine, but is maintained in addition to it in order to speculatively determine return addresses for functions at the front-end of the machine. In contrast to the RAS, the GRAS stores both the guest-targets and the corresponding native-targets of the function return addresses.

By storing both the guest-target and the native-target, the GRAS of the present invention advantageously precludes adding an entry to the CLB for every instance of a function return. Instead, the information is obtained from the GRAS.

It should be noted that the GRAS structure is speculatively maintained at the front end of the pipeline. For example, the stack operation for the GRAS is typically performed in the Fetch Unit. Because the GRAS is maintained speculatively, entries in it may need to be occasionally cleared or flushed in case of a misprediction in the control flow of the program code. Accordingly, embodiments of the present invention need to continue maintaining a software RAS at the back-end of the machine to compare and validate the return addresses predicted by the hardware GRAS.

Figures 4A, 4B, 4C:
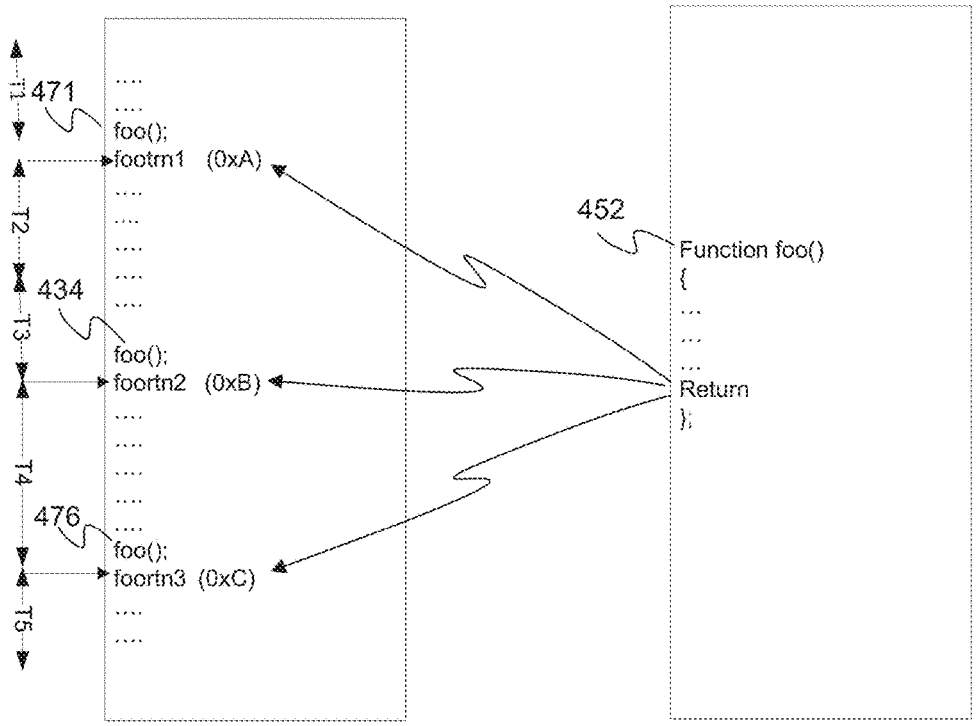
FIG. 4A illustrates an exemplary sequence of instructions in guest address space that invokes the same function multiple times.
FIGS. 4B-C illustrate the manner in which the GRAS is updated in accordance with embodiments of the invention.

FIG. 4A illustrates an exemplary sequence of instructions in guest address space that invokes the same function multiple times. Function foo 452 is invoked (or called) at 3 instances within the guest code, e.g., at address 471, 434 and 476. Call 471, for example, has a return address of 0xA, which would be mapped to sequence T2 in the native address space. Call 434, for example, has a return address of 0xB, which would be mapped to sequence T4 in the native address space. And call 476, for example, has a return address of 0xC, which would be mapped to sequence T5 in the native address space.

Instead of storing a mapping for the corresponding return address for each of the invocations of function foo in a CLB, embodiments of the present invention provide a GRAS, wherein new entries, in response to a function invocation, can be pushed into the stack with the return address of the call. When an entry is pushed into the stack, both the guest address and the corresponding native address associated with the function return are pushed onto the stack. Further, the entry can be popped out of the stack upon a return in the guest code, and the native address corresponding to the entry popped out can be used to redirect the front-end of the machine to fetch instructions from. By maintaining both the guest address and the corresponding native address in the GRAS, a separate mapping for each instance of a function return does not need to be saved in the CLB.

Pushing a new entry into the stack and popping out the entry out of the stack in response to a return in the guest-code enables the GRAS to be used as a temporary space for storing the mappings. This eliminates the need to look up the CLB for a return address in the guest space. Instead, both the guest and the native return addresses are popped off the GRAS. The corresponding native address obtained can be used to redirect the front-end of the machine to fetch the next instruction following the function return in native address space.

FIGS. 4B-C illustrate the manner in which the GRAS is updated in accordance with embodiments of the invention. FIG. 4B provides an example of the manner in which the GRAS is updated in response to call 471 of function foo. When function call 471 for function foo 452 is encountered in the code during execution, both the guest return address (0xA) and the corresponding native return address (T2) are pushed into the GRAS 490 at entry 491. Subsequently, after the function foo has executed and returned, entry 491 is popped from the GRAS 490 and used to redirect the front-end of the machine to native sequence T2 to fetch instructions from.

FIG. 4C provides an example of the manner in which the GRAS is updated in response to call 434 of function foo. When function call 434 for function foo 452 is encountered in the code during execution, both the guest return address (0xB) and the corresponding native return address (T4) are pushed into the GRAS 490 at entry 492. Subsequently, after the function foo has executed and returned, entry 492 is popped from the GRAS 490 and used to redirect the front-end of the machine to native sequence T4 to fetch instructions from.

Instantiation 476 for function foo is treated in a similar way to calls 471 and 434 when processed during execution.

As discussed above, pushing a new entry into the stack (in response to a call) and popping out the entry out of the stack in response to a return in the guest-code enables the GRAS to be used as a temporary space for storing the mappings for function returns between guest space and address space. This eliminates the need to look up the CLB for return addresses in the guest space. Instead, both the guest and the native return addresses are popped off the GRAS at the same time. The native address is then used to redirect the front-end to fetch instructions from, as discussed above.

In one embodiment, when the guest to native mapping is created in software initially prior to the execution of the code, certain instructions are introduced during the mapping in order to emulate guest call-return behavior. For example, a function call in guest code can be converted to a "GRAS.PUSH" instruction followed by a "G.BRN" instruction, as will be discussed further below. Also, a function return in guest code can be converted to a "G.BRN.RTN" instruction, which will also be described further below.

A) GRAS.PUSH disp32: During the mapping process, a function call in guest code is emulated using a "GRAS.PUSH" instruction followed by a "G.BRN" instruction. The GRAS.PUSH instruction pushes the return address (both the guest and corresponding native return address) onto the stack. Disp32 is the displacement from the beginning of the current calling function. With GRAS.PUSH, the return address in guest space can be calculated using the address of the current calling function plus the displacement. This calculated return address is then pushed into the stack along with the corresponding native address, which is also encoded into instruction GRAS.PUSH during the mapping process by software. The "G.BRN" instruction is a branch instruction that jumps to the called function once the respective return addresses have been pushed into the GRAS.

As discussed above, the return address pushed to the stack comprises both native and guest address components. The instruction is decoded early in the machine to enable the return address to be pushed onto the hardware GRAS.

B) G.BRN.RTN: During the mapping process, a function return in guest code is emulated using a "G.BRN.RTN" instruction. G.BRN.RTN pops the stack and jumps to the popped address in native space. The front-end of the machine then starts fetching from this native address.

Since the GRAS is of finite size and since operations on the hardware stack are performed at the front-end of the machine speculatively, their accuracy is not guaranteed. Accordingly, this requires additional validation of the entry popped from the GRAS. The contents popped from the GRAS are typically attached along with the "G.BRN.RTN" instruction and sent down the pipeline. The validation is performed by popping a corresponding entry from the software RAS and comparing the two entries. In other words, the entry popped from the GRAS is compared with the entry popped from the software RAS at the back-end of the machine. On a mismatch, the entry in software stack takes priority and can be used to redirect the front-end of the machine.

Figure 5:
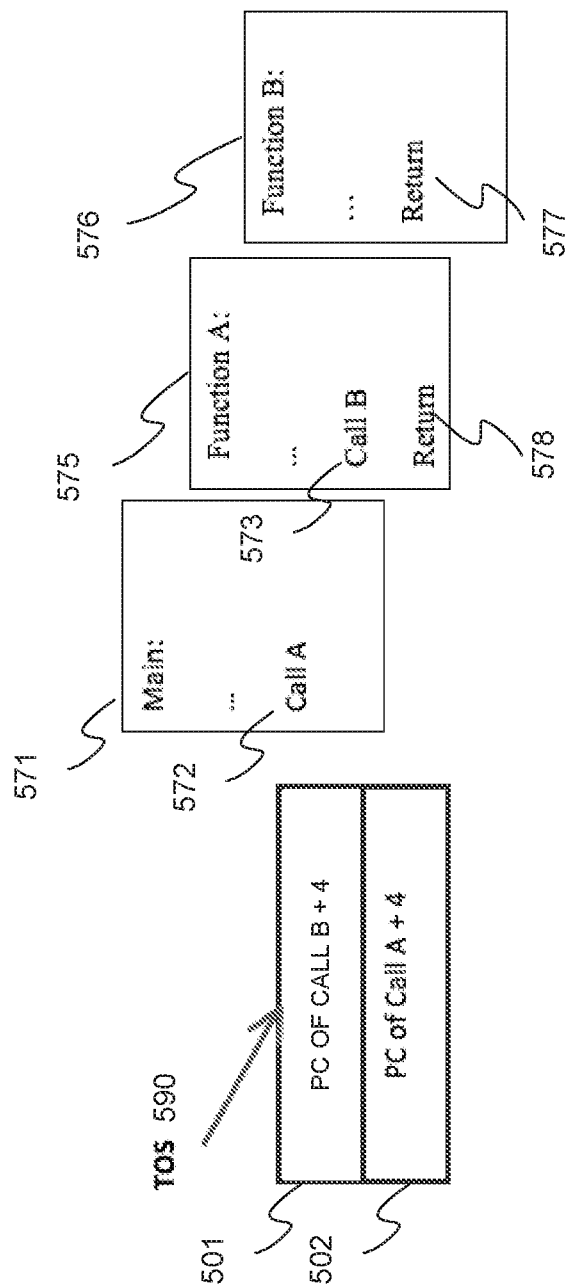
FIG. 5 illustrates another example of the manner in which GRAS is updated in accordance with embodiments of the present invention.

FIG. 5 illustrates another example of the manner in which GRAS is updated in accordance with embodiments of the present invention. Execution begins with instruction sequences 571. When a call 572 to function A 575 is performed, the return address corresponding to call A 572 is pushed into the stack at entry 502. Entry 502 comprises both the guest return address (PC of Call A+4) and the native return address (not shown). When a call 573 is then performed to function B 576, the return address corresponding to call B 573 is pushed into the stack at entry 501. Entry 501 comprises both the guest return address (PC of Call B+4) and the native return address (not shown). The GRAS now contains two entries.

When return 577 in function B 576 is encountered, the top of stack (TOS) pointer 590 will be used to predict the target of the return and the stack will be popped. When return 578 in function A 575 is encountered, again the TOS (now pointing at entry 502) will be used to predict the target of the return and the stack will be popped. After returns 577 and 578, the GRAS will be empty.

The simple stack operation shown in FIG. 5 may not be sufficient in a wide and deep superscalar processor, wherein several calls and returns in flight may be encountered. Some of these calls may be in the wrong (mispredicted) path and corrupt the stack information even if TOS is recovered correctly.

Figure 6:
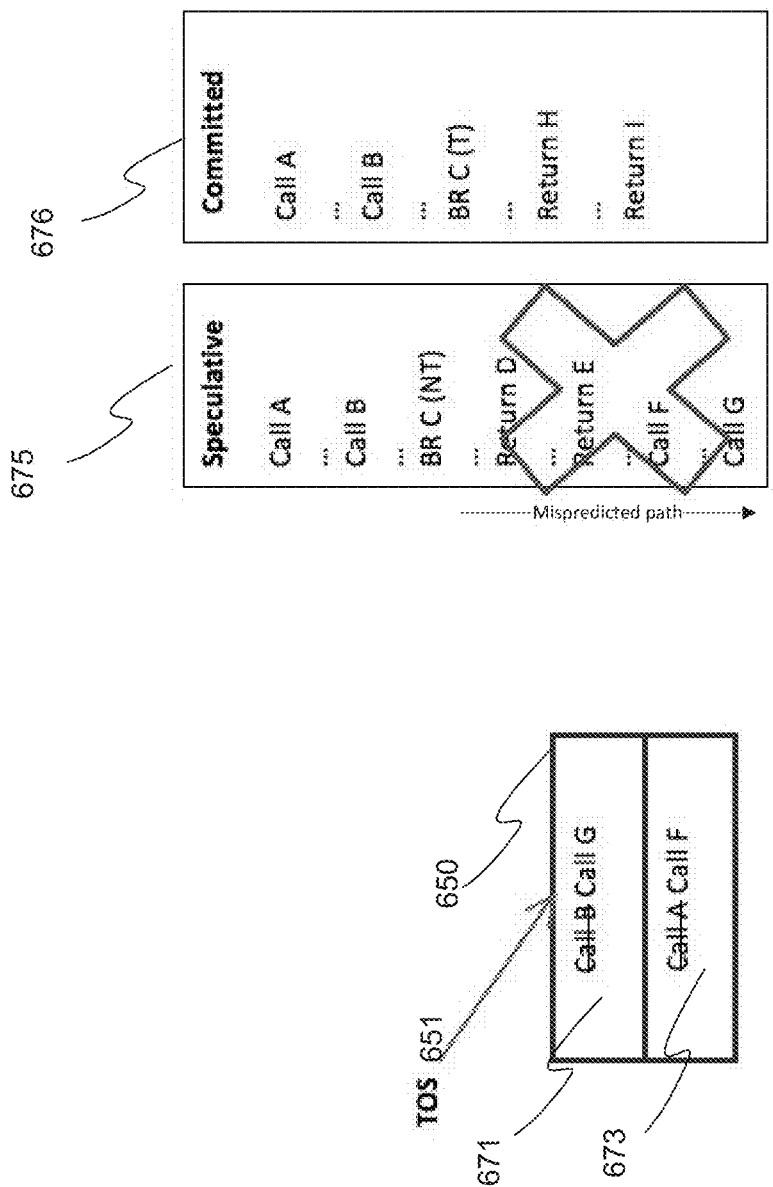
FIG. 6 illustrates an example of the manner in which a GRAS may get corrupted if maintained as a regular stack.

FIG. 6 illustrates an example of the manner in which a GRAS may get corrupted if maintained as a regular stack. For example, instruction sequence 675 comprises the speculative path that the OOO processor followed while instruction sequence 676 comprises instructions that were actually committed at the back-end of the pipeline. When Call A and Call B are encountered on the speculative path during execution, return addresses corresponding to the calls are pushed into GRAS 650 at entries 673 and 671 respectively. If Branch C is erroneously predicted as Not Taken (NT) on the speculative path, then instructions Return D and Return E would pop the stack twice and entries for Call A and Call B would be overwritten by new entries corresponding to Call F and Call G (which would be pushed onto the stack after popping the entries corresponding to Call A and Call B).

However, as noted above, Branch C is mispredicted and, therefore, instruction Return D and beyond would all fall under the mispredict shadow of Branch C. Once a branch is mispredicted, the TOS pointer 651 could be recovered in software to stack entry 671. However, the contents of both stack entry 673 and 671 have been overwritten and corrupted. The entries for Call A and Call B cannot be recovered because they have been overwritten. As a result, popping the stack in response to instructions Return H and Return I on the committed path would yield incorrect addresses.

In one embodiment of the present invention, the GRAS is maintained and updated similar to a linked list structure to prevent the stack from getting corrupted. For example, the GRAS is implemented using a circular buffer with each entry carrying a pointer to a prior entry. Also, in one embodiment, a global variable is maintained that points to the top of the stack and another global variable that points to the next available entry in the GRAS. A new mapping associated with a function call is inserted into the next available entry, thus no entry is overwritten. Accordingly, in the case of a misprediction, the pointers used to keep track of the entries in the GRAS can simply be adjusted to recover a prior state. Because no entries are overwritten, the linked-list implementation of the GRAS structure prevents corruption of the stack in the event of a misprediction.

It should be noted that while the linked list structure is used in association with the GRAS of the present invention to solve problems related to speculation in the guest space, it can also be used in connection with a conventional RAS in native space.

As noted above, each entry in the circular GRAS maintains a previous pointer to maintain the stack semantics. Because stack entries are no longer necessarily consecutive, each entry maintains a pointer to point to the previous stack entry, which was the TOS when the entry was inserted. The example illustrated in connection with FIGS. 7 and 8 will clarify the manner in which the previous pointer for each stack entry works.

A global next pointer variable is maintained to point to the next available entry in the GRAS in circular fashion. In one embodiment, the next pointer is always incremented and never decremented. A call is accordingly inserted into the next available entry and, therefore, no entry is overwritten.

Figure 7:
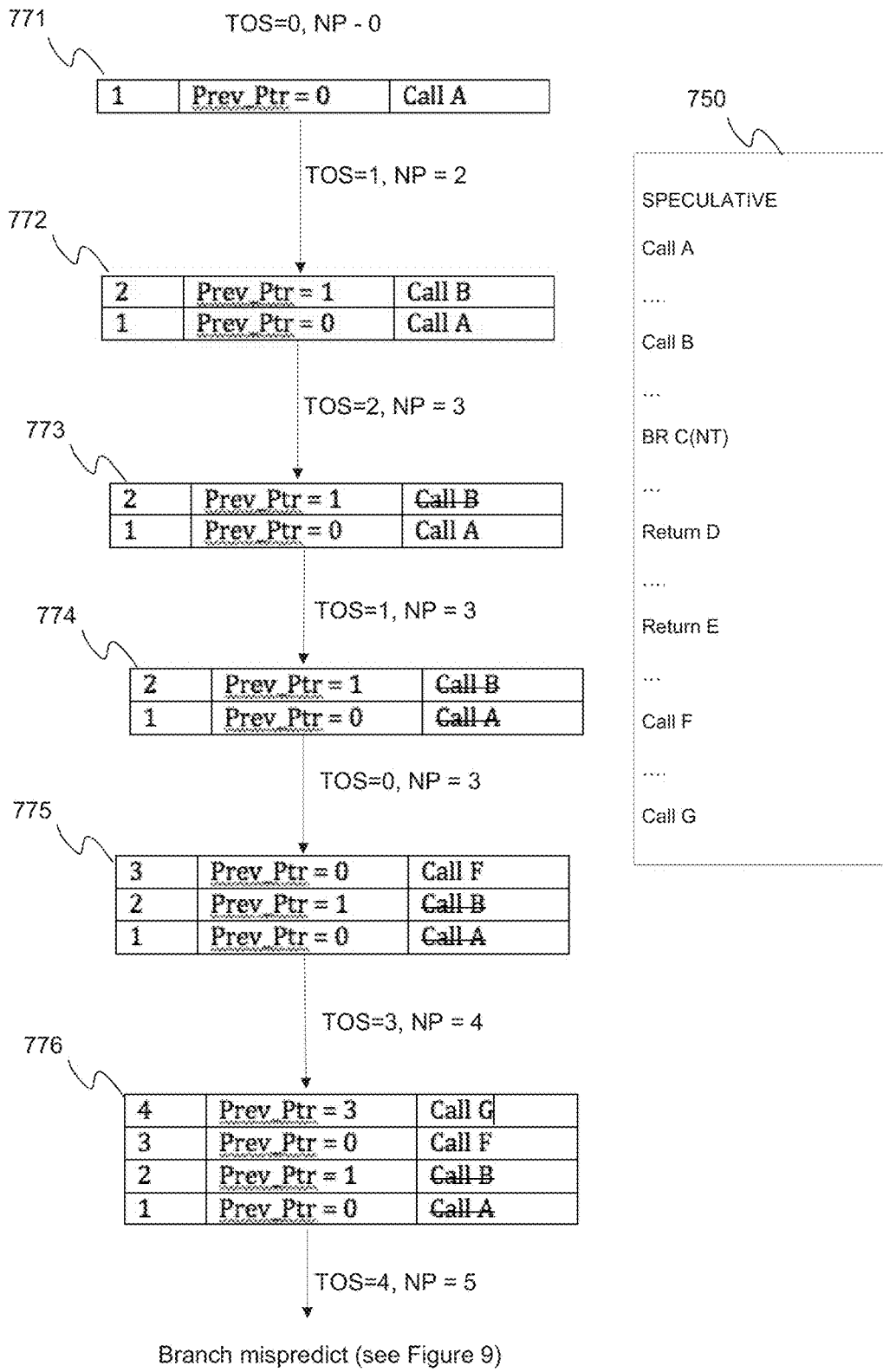
FIG. 7 illustrates the manner in which the linked-list implementation of the GRAS is updated speculatively in response to the instruction sequence illustrated in FIG. 6 in accordance with one embodiment of the present invention.

FIG. 7 illustrates the manner in which the linked-list implementation of the GRAS is updated speculatively in response to the instruction sequence illustrated in FIG. 6 in accordance with one embodiment of the present invention. FIG. 7 will illustrate the manner in which the GRAS is updated assuming that Branch C within sequence 675 of FIG. 6 (also illustrated as sequence 750 in FIG. 7) is erroneously predicted to be not taken.

Prior to call A, the next pointer and top of stack (TOS) pointer both may be initialized to value of 0. After the call to function A, the return address (both the guest address and the native mapping) for call A is pushed into the GRAS at location 1 as shown in table 771. Also, the previous pointer value is updated to a value of 0, which is the value that the TOS variable had when the entry for call A was inserted. After inserting the entry for call A, the pointer for TOS is updated to a value of 1 and the next pointer is updated to point to the next available entry in the stack, 2.

Following the call to function B, the corresponding entry for call B is pushed into the GRAS at location 2 as shown in table 772. The previous pointer value for entry 2 is updated to a value of 1, which is the value that the TOS variable had when the entry for call B was inserted. After inserting the entry for call B, the pointer for TOS is updated to a value of 2 and the next pointer is updated to point to the next available entry in the stack, 3.

If Branch C is mispredicted as Not Taken (NT), then instructions Return D and Return E will be processed next. Return D pops the entry associated with Call B, as shown in table 773, however, this entry is neither deleted nor overwritten in hardware. Instead, in the linked-list implementation of the present invention, the TOS pointer is updated to point to location 1 to indicate that the entry at location 2 has been popped. However, the next pointer value is still maintained at a value of 3, which is the next available location. Maintaining the next pointer to point to location 3 ensures that entries 1 and 2 will not be overwritten.

Instruction Return E pops the entry associated with Call A, as shown in table 774. Again, the entry associated with Call A is not overwritten or deleted. The TOS pointer is simply updated to a value of 0 indicating that the entry at location 1 was popped. The next pointer, meanwhile, is still maintained at 3.

When call F is encountered in the instruction sequence 750, an entry corresponding to call F is entered at location 3 as shown in Table 775. Next pointer, as discussed above, pointed to location 3, even though entries corresponding to calls A and B were popped. The corresponding previous pointer value for the call F entry is 0 because it takes the value of TOS prior to the current entry. TOS, meanwhile, is updated to 3 and next pointer is updated to a value of 4.

Finally, for call G, an entry corresponding to call G is entered at location 4 as shown in Table 776. The corresponding previous pointer value for the call G entry at location 4 is 3, because that is the value of TOS prior to updating the GRAS with the entry for call G. TOS is updated to 4 and next pointer is updated to a value of 5, which is the next available entry in the GRAS.

Figure 8:
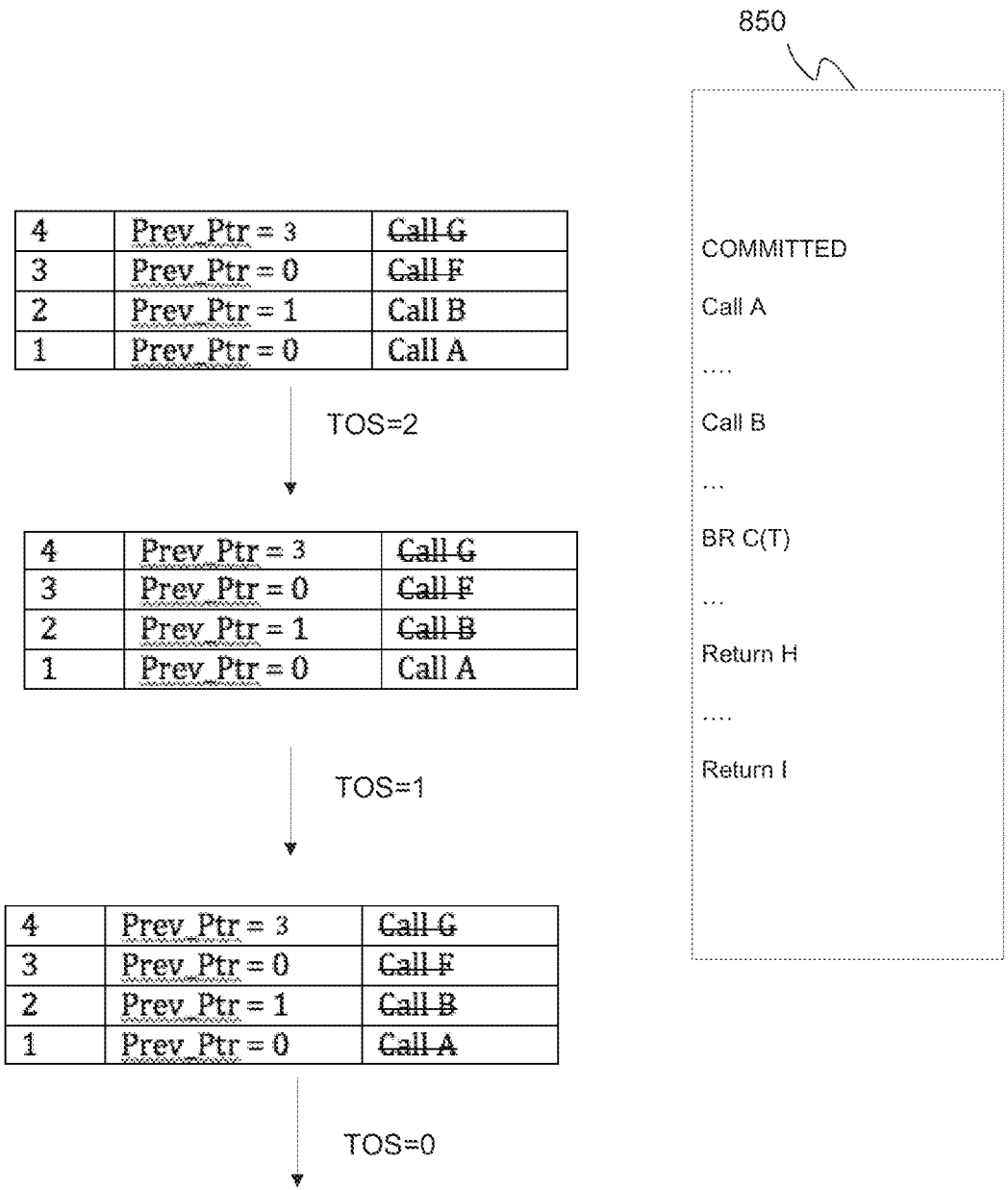
FIG. 8 illustrates the manner in which the linked-list implementation of the GRAS is updated in response to a branch mispredict in accordance with one embodiment of the present invention.

FIG. 8 illustrates the manner in which the linked-list implementation of the GRAS is updated in response to a branch mispredict in accordance with one embodiment of the present invention. FIG. 8 uses the example from FIGS. 6 and 7 to illustrate the manner in which the GRAS is updated assuming that the correct control path comprises Branch C within sequence 676 of FIG. 6 (also illustrated as sequence 850 in FIG. 8) being taken.

If Branch C is mispredicted, then entries for Call G and Call F need to be popped out of the GRAS and the GRAS needs to be restored back to the state it was in prior to the Branch C mispredict. In order to restore the GRAS back to its prior state, TOS is recovered to a value of 2. No change is made to the next pointer. TOS is recovered because each branch carries with it state information, e.g., information regarding the value of the TOS at the time the prediction was made. This allows the TOS value to be recovered in case of a branch mispredict. Setting the TOS to 2, in effect, restores the stack back to the state it was in as reflected by table 772 (with the exception that the next pointer now points to 5). When instructions Return H and Return I are encountered in sequence 850, corresponding entries for Call B and Call A are popped off as shown in FIG. 8.

Figure 9:
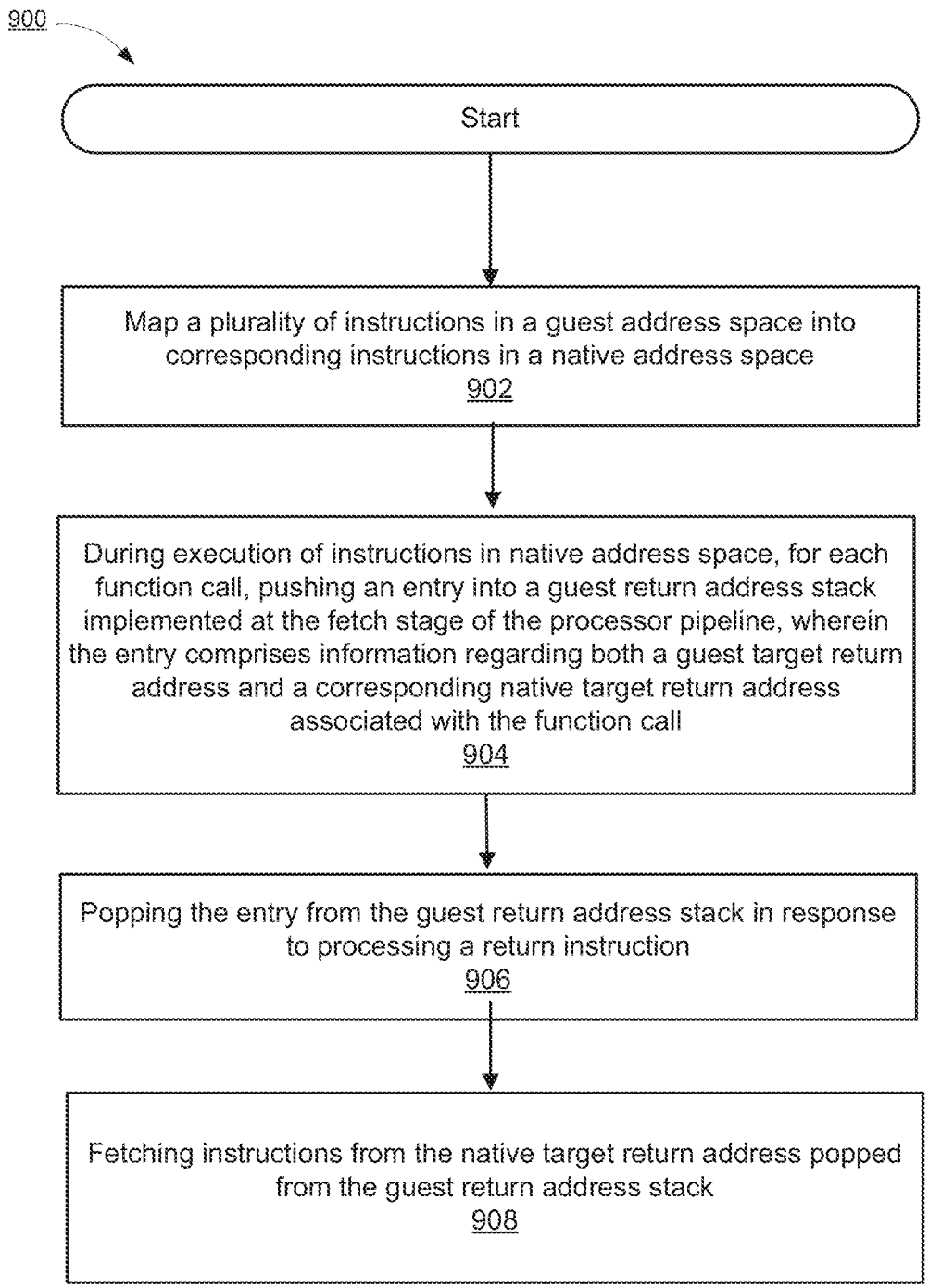
FIG. 9 depicts a flowchart 900 for an exemplary computer controlled process for maintaining a guest return address stack in accordance with embodiments of the present invention.

FIG. 9 depicts a flowchart 900 for an exemplary computer controlled process for maintaining a guest return address stack in accordance with embodiments of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 9 should not be construed as limiting the scope of the invention. Rather, it will be apparent to persons skilled in the relevant art(s) from the teachings provided herein that other functional flows are within the scope and spirit of the present invention. Flowchart 900 may be described with continued reference to exemplary embodiments described above, though the method is not limited to those embodiments. Process 900 may be implemented in hardware as well.

At step 902, a plurality of instructions are mapped from a guest address space to a native address space.

At step 904, the instructions in the native address space begin executing. For each function call instruction that is processed, an entry is pushed into a guest return address stack (GRAS), wherein, as discussed above and as shown in FIGS. 4B, 4C, and 5, the entry comprises a guest target return address associated with the function call and a corresponding native target return address. Further, the guest return address stack is updated speculatively at the front-end of the machine, e.g., at the fetch stage of the pipeline.

At step 906, the entry associated with the function call is popped in response to processing a return instruction. As discussed in relation to FIGS. 4B and 4C, the popped entry comprises the predicted native target return address for the control flow of the program to jump to.

At step 908, instructions are fetched speculatively from the native target return address obtained from the popped entry in the guest return address stack.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A microprocessor implemented method of speculatively maintaining a guest return address stack for an out-of-order microprocessor pipeline, said method comprising:
    mapping a plurality of instructions in a guest address space to a corresponding plurality of instructions in a native address space;
    and for each function call instruction in said native address space fetched during execution, performing:
        pushing a current entry into said guest return address stack (GRAS) responsive to a function call, wherein said GRAS is maintained at a fetch stage of the pipeline, and wherein said current entry comprises information regarding both a guest target return address and a corresponding native target return address associated with said function call, wherein said mapping comprises mapping said function call in said guest address space to a corresponding instruction in said native address space, wherein said corresponding instruction performs said pushing when processed in said native address space during execution;
        popping said current entry from said GRAS in response to processing a return instruction;
        comparing said current entry with an entry popped from a return address stack (RAS) to validate said current entry, wherein said RAS is maintained at a later stage of the pipeline with respect to said fetch stage of the pipeline, and wherein said current entry is attached to said return instruction at said fetch stage of the pipeline and sent through the pipeline along with said return instruction to said later stage of the pipeline; and
        fetching instructions from said native target return address in said current entry after said popping from said GRAS.

2. The method of claim 1, wherein said return instruction corresponds to a return from said function call.

3. The method of claim 1, wherein said mapping further comprises:
    mapping said return instruction to an instruction corresponding to said return instruction in said native address space, wherein said return instruction performs said popping when processed in said native address space during execution.

4. The method of claim 1, wherein said GRAS is a circular buffer, and wherein said circular buffer maintains:
    a global next pointer value, wherein said global next pointer value indicates a position of a next available entry in said GRAS; and
    a previous pointer value for each entry in said GRAS, wherein said previous pointer value points to a prior entry in said GRAS.

5. The method of claim 4, wherein said pushing further comprises:
    incrementing a global top of stack (TOS) value, wherein said global top of stack value indicates a top of stack location of said GRAS;
    incrementing said global next pointer value to point to said next available entry in said GRAS; and
    updating a previous pointer for said current entry with a TOS value prior to said pushing.

6. The method of claim 5, wherein said popping further comprises:
    decrementing said global TOS value; and
    updating said previous pointer for said current entry with an updated TOS value prior to said popping.

7. A processor unit configured to perform operations for speculatively maintaining a guest return address stack of an out-of-order microprocessor pipeline, said operations comprising:
    mapping a plurality of instructions in a guest address space into a corresponding plurality of instructions in a native address space; and
    for each function call instruction in said native address space fetched during execution, performing:
        pushing a current entry into said guest return address stack (GRAS) responsive to a function call, wherein said GRAS is maintained at a fetch stage of the pipeline, and wherein said current entry comprises information regarding both a guest target return address and a corresponding native target return address associated with said function call, wherein said mapping comprises mapping a function call in said guest address space to a corresponding instruction in said native address space, wherein said corresponding instruction performs said pushing when processed in said native address space during execution,
        popping said current entry from said GRAS in response to processing a return instruction,
        comparing said current entry with an entry popped from a return address stack (RAS) to validate said current entry, wherein said RAS is maintained at later stage of the pipeline with respect to said fetch stage of the pipeline, and wherein said current entry is attached to said return instruction at said fetch stage of the pipeline and sent through the pipeline along with said return instruction to said later stage of the pipeline, and
        fetching instructions from said native target return address in said current entry after said popping from said GRAS.

8. The processor unit of claim 7, wherein said return instruction corresponds to a return from said function call.

9. The processor unit of claim 7, wherein said mapping further comprises:
    mapping said return instruction to an instruction corresponding to said return instruction in said native address space, wherein said return instruction performs said popping when processed in said native address space during execution.

10. The processor unit of claim 7, wherein said GRAS is a circular buffer, and wherein said circular buffer maintains:
a global next pointer value, wherein said global next pointer value indicates a position of a next available entry in said GRAS; and
a previous pointer value for each entry in said GRAS, wherein said previous pointer value points to a prior entry in said GRAS.

11. The processor unit of claim 10, wherein said pushing further comprises:
incrementing a global top of stack (TOS) value, wherein said global top of stack value indicates a top of stack location of said GRAS;
incrementing said global next pointer value to point to said next available entry in said GRAS; and
updating a previous pointer for said current entry with TOS value prior to said pushing.

12. The processor unit of claim 11, wherein said popping further comprises:
decrementing said global TOS value; and
updating said previous pointer for said current entry with an updated TOS value prior to said popping.

13. An apparatus configured to perform a method of speculatively maintaining a guest return address stack of an out-of-order microprocessor pipeline, said apparatus comprising:
a memory; and
a processor communicatively coupled to said memory, wherein said processor is configured to process instructions out of order, and further wherein said processor is configured to perform operations comprising:
mapping a plurality of instructions in a guest address space into a corresponding plurality of instructions in a native address space and
for each function call instruction in said native address space fetched during execution, performing:
pushing a current entry into said guest return address stack (GRAS) responsive to a function call, wherein said GRAS is maintained at a fetch stage of the pipeline, and wherein said current entry comprises information regarding both a guest target return address and a corresponding native target return address associated with said function call, wherein said mapping comprises mapping said function call in said guest address space to a corresponding instruction in said native address space, wherein said corresponding instruction performs said pushing when processed in said native address space during execution,
popping said current entry from said GRAS in response to processing a return instruction,
comparing said current entry with an entry popped from a return address stack (RAS) to validate said current entry, wherein said RAS is maintained at later stage of the pipeline with respect to said fetch stage of the pipeline, and wherein said current entry attached to said return instruction at said fetch stage of the pipeline and is sent through the pipeline along with said return instruction to said later stage of the pipeline, and
fetching instructions from said native target return address in said current entry after said popping from said GRAS.

14. The apparatus of claim 13, wherein said return instruction corresponds to a return from said function call.

15. The apparatus of claim 13, wherein said mapping further comprises:
mapping said return instruction to an instruction corresponding to said return instruction in said native address space, wherein said return instruction performs said popping when processed in said native address space during execution.

16. The apparatus of claim 13, wherein said GRAS is a circular buffer, and wherein said circular buffer maintains:
a global next pointer value, wherein said global next pointer value indicates a position of a next available entry in said GRAS; and
a previous pointer value for each entry in said GRAS, wherein said previous pointer value points to a prior entry in said GRAS.

17. The apparatus of claim 16, wherein said pushing further comprises:
incrementing a global top of stack (TOS) value, wherein said global top of stack value indicates a top of stack location of said GRAS;
incrementing said global next pointer value to point to said next available entry in said GRAS; and
updating a previous pointer for said current entry with a TOS value prior to said pushing.

18. The apparatus of claim 17, wherein said popping further comprises:
decrementing said global TOS value; and
updating said previous pointer for said current entry with an updated TOS value prior to said popping.

* * * * *